(12) United States Patent
Tamasi

(10) Patent No.: US 7,886,094 B1
(45) Date of Patent: Feb. 8, 2011

(54) METHOD AND SYSTEM FOR HANDSHAKING CONFIGURATION BETWEEN CORE LOGIC COMPONENTS AND GRAPHICS PROCESSORS

(75) Inventor: Anthony Michael Tamasi, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 11/154,044

(22) Filed: Jun. 15, 2005

(51) Int. Cl.
G06F 13/00 (2006.01)
G06F 13/36 (2006.01)
G06F 13/42 (2006.01)

(52) U.S. Cl. ........................... 710/104; 710/311
(58) Field of Classification Search ................. 710/312, 710/305–306, 100, 56, 23, 311, 104; 713/601; 345/502
See application file for complete search history.

(56) References Cited

U.S. PATENT DOCUMENTS

| | | | |
|---|---|---|---|
| 5,212,633 A | 5/1993 | Franzmeier | |
| 5,237,460 A | 8/1993 | Miller et al. | |
| 5,892,964 A * | 4/1999 | Horan et al. | 712/33 |
| 5,949,436 A * | 9/1999 | Horan et al. | 345/501 |
| 6,021,506 A * | 2/2000 | Cho et al. | 713/601 |
| 6,326,973 B1 * | 12/2001 | Behrbaum et al. | 345/532 |
| 6,346,946 B1 * | 2/2002 | Jeddeloh | 345/503 |
| 6,496,193 B1 | 12/2002 | Surti et al. | |
| 6,523,102 B1 | 2/2003 | Dye et al. | |
| 6,545,683 B1 | 4/2003 | Williams | |
| 6,545,684 B1 | 4/2003 | Dragony et al. | |
| 6,670,958 B1 * | 12/2003 | Aleksic et al. | 345/502 |
| 6,690,381 B1 | 2/2004 | Hussain et al. | |
| 6,704,022 B1 | 3/2004 | Aleksic | |
| 6,750,870 B2 | 6/2004 | Olarig | |
| 6,901,497 B2 | 5/2005 | Tashiro et al. | |
| 7,061,640 B1 | 6/2006 | Maeda | |
| 2002/0085000 A1 | 7/2002 | Sullivan et al. | |
| 2003/0001857 A1 | 1/2003 | Doyle | |
| 2003/0169269 A1 | 9/2003 | Sasaki et al. | |
| 2004/0205281 A1 | 10/2004 | Lin et al. | |
| 2005/0140682 A1 | 6/2005 | Sumanaweera et al. | |
| 2006/0282604 A1 * | 12/2006 | Temkine et al. | 710/314 |
| 2007/0200849 A1 * | 8/2007 | Chen | 345/426 |

OTHER PUBLICATIONS

Pancescu, Alexandru;"AMD Chipsets to Accelerate Performance: The AutoXpress feature is the key"; SOFTPEDIA.com; Sep. 25, 2007; available online at softpedia.com; pp. 1-4.*
Application As Filed U.S. Appl. No. 11/129,099; Filed May 13, 2005.
Application As Filed U.S. Appl. No. 11/253,875; Filed Oct. 18, 2005.

* cited by examiner

*Primary Examiner*—Ryan M Stiglic

(57) ABSTRACT

A system for implementing handshaking configuration to enable coordinated data execution in a computer system. The system includes a core logic component coupled to a system memory and a graphics processor coupled to the core logic component via a graphics bus. The graphics processor and the core logic component implement a configuration communication to selectively configure coordinated data execution between the graphics processor and the core logic component via communication across the graphics bus.

21 Claims, 6 Drawing Sheets

METHOD AND SYSTEM FOR HANDSHAKING CONFIGURATION BETWEEN CORE LOGIC COMPONENTS AND GRAPHICS PROCESSORS

FIELD OF THE INVENTION

The present invention is generally related to the configuration of digital integrated circuit components of computer systems.

BACKGROUND OF THE INVENTION

The core logic of a computer system functions as the central highway and central interchange for the majority of data that passes through a computer system. The core logic typically comprises one or more integrated circuit components that are mounted on a printed circuit board (e.g., motherboard), and is generally referred to as a chipset. A core logic chipset operates as the central data transfer system of a computer. Data is transferred to and from other processors that are coupled to the core logic chipset (e.g., mounted on the motherboard). Such processors include, for example, the central processing unit (CPU), the graphics processing unit (GPU), and the like.

One of the primary functions of the core logic chipset is to provide communications pathways for the CPU, GPU, and the like, to communicate with system memory. For example, the core logic chipset is generally responsible for the addressing of system memory locations, performing all of the various signaling mechanisms required to physically address the multiple memory chips on one or more memory modules (DIMMs, etc.), and the like. The core logic chipset is also responsible for supporting the different features that different types of memory may support. Additionally, the core logic is responsible for interfacing with the expansion bus (e.g., PCI, 1394, etc.) and managing various input output devices (e.g., disk drives, Ethernet adapters, etc.).

The GPU of the computer system comprises an integrated circuit component that is optimized to process 3-D image data. Generally, the GPU is coupled to receive and transmit data through the core logic chipset and handles image related processing (e.g., full-motion video decompression, 3-D image processing, real-time 3-D rendering, etc.) for the computer system. In most configurations, the CPU executes general purpose processing (e.g., simulation, word processing, CAD, etc.) while the GPU utilizes its specialized hardware to handle graphics related and 3-D rendering functions. In a typical graphics computer system, most (if not all) of the processor intensive rendering computations are performed by the GPU.

High-performance graphics rendering is a key factor in a computer systems overall usability and appeal. The graphical depiction of data, through, for example, full motion video, detailed true color images, photorealistic 3-D modeling, and the like, has become a preferred mechanism for presenting complex data to the user. Increasing the performance and/or the realism of interactive three-dimensional images and scenes has become a primary driver for the increasing performance of newer computer systems. The performance of a typical graphics rendering process as implemented on a graphics computer system is highly dependent upon the performance of the underlying core logic chipset. For example, high performance graphics rendering requires efficiently managed data transfers between the GPU and system memory.

To increase the performance of the computer system, computer system designers have added a number of high-performance features to the GPUs coupled to the core logic chipset. In addition to increasing the capability of the GPUs, computer system designers have also added a number of high-performance features to the core logic chipset itself. In an ideal case, a discrete GPU component (e.g., an add-in graphics card) can be custom-designed to function with a specific core logic chipset, thus forming a customized configuration, whereby features of the core logic chipset are designed to function in cooperation with features of the discrete GPU component.

The problem with such customization is the fact that the industry standard x86 architecture computer system is an open architecture, whereby a given computer system can be assembled with components (e.g., core logic chipsets, CPUs, GPUs, input output devices, etc.) from a large number of different manufacturers. Open architectures depend on adherence to a set of basic specifications and protocols to ensure interoperability and reliability. Furthermore, a given x86 computer system can be assembled with different components from different generations from the same manufacturer (e.g., a "high-performance" core logic chipset coupled with an earlier generation GPU, etc.). These limitations make such customization and close cooperation between different components of the industry standard x86 architecture computer system impractical. Thus what is needed is a way to efficiently configure different components of a computer system to improve performance.

SUMMARY OF THE INVENTION

Embodiments of the present invention provide an efficient way to enable cooperative data processing and data execution between core logic components of a computer system and graphics processors of the computer system. Embodiments of the present invention implement a handshaking mechanism that enables a mutual identification and negotiation of mutually supported cooperative processing functions between the core logic components and the graphics processors that can be used to execute specialized or customized functions that are above and beyond basic standardized functionality. This specialized/customized functionality can be selectively provided without compromising compatibility with industry standard x86 core logic chipsets or graphics processors.

In one embodiment, the present invention is implemented as a system for implementing handshaking configuration to enable coordinated data execution between a core logic component and a graphics processor in a computer system. The system includes a core logic component (e.g., a bridge chip) coupled to a system memory and a graphics processor (e.g., a GPU) coupled to the core logic component via a graphics bus. The graphics processor and the core logic component implement a configuration communication to selectively configure coordinated data execution between the graphics processor and the core logic component via communication across the graphics bus. The core logic component can be a Northbridge of the computer system and the graphics processor can be a discrete graphics processor (e.g., GPU) of a detachable graphics card.

In one embodiment, the configuration communication is a message exchange communication (e.g., handshaking) for identifying the at least one cooperative processing function that is supported by both the graphics processor and the core logic component. The mutually supported cooperative processing function can be identified by the graphics processor and the core logic component each accessing respective functionality tables that describe which cooperative processing functions each of them support. If there are no mutually supported cooperative processing functions (e.g., as in a case where the graphics processor and the core logic component are from different manufacturers that have built-in different capabilities), a basic functional level can be implemented (e.g., standard Northbridge functions, standard graphics processor functions, etc.).

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
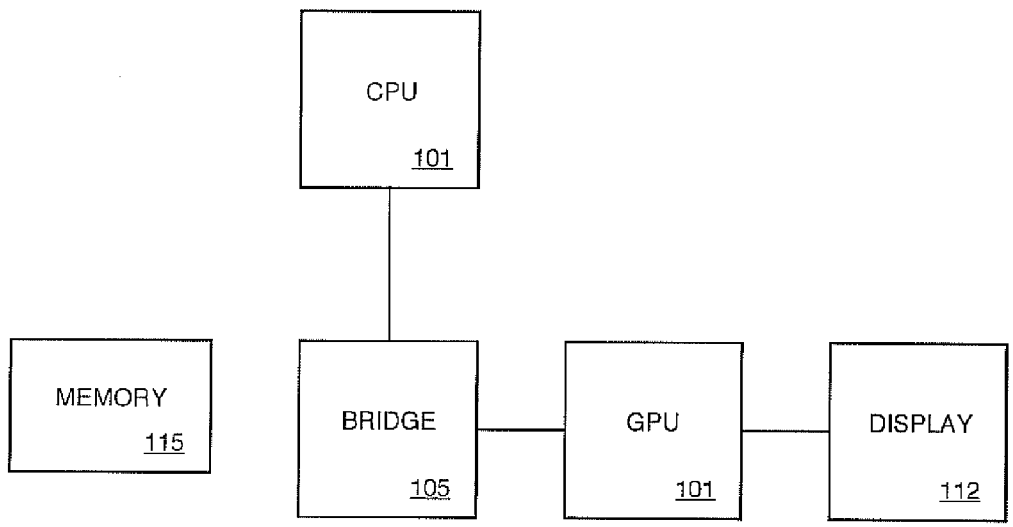
FIG. 1 shows the basic components of a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "communicating" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via the bridge component 105 or can be directly coupled to the system memory 115 via a memory controller internal to the CPU 101. The bridge component 105 (e.g., Northbridge) can support expansion buses that connect various I/O devices (e.g., one or more hard disk drives, Ethernet adapter, CD ROM, DVD, etc.). The GPU 110 is coupled to a display 112. One or more additional GPUs can optionally be coupled to system 100 to further increase its computational power. The GPU(s) are coupled to the CPU 101 and the system memory 115 via the bridge component 105. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory and system memory, IO devices, and the like. Similarly, system 100 can be implemented as a set-top video game console device such as, for example, the Xbox®, available from Microsoft Corporation of Redmond, Wash.

It should be appreciated that although the GPU 110 is depicted in FIG. 1 as a discrete component, the GPU 110 can be implemented as a discrete graphics card designed to couple to the computer system 100 via a connector (e.g., AGP slot, PCI express slot, etc.), as a discrete integrated circuit die (e.g., mounted directly on the motherboard), or as an integrated GPU included within the integrated circuit die of a computer system chipset component (e.g., integrated within the bridge chip 105). Additionally, a local graphics memory can be included for the GPU 110 for high bandwidth graphics data storage.

Embodiments of the Invention

Figure 2:
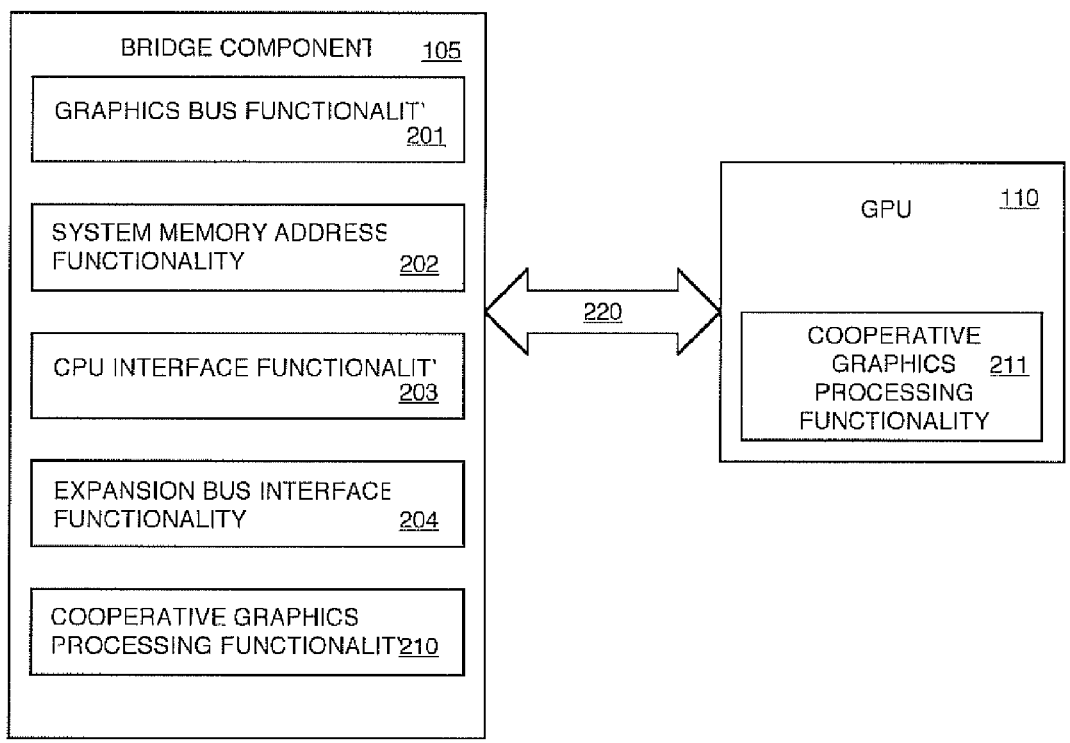
FIG. 2 shows a diagram depicting the internal components of a bridge component and a GPU in accordance with one embodiment of the present invention.

FIG. 2 shows a diagram depicting the internal components of the bridge component 105 and the GPU 110 in accordance with one embodiment of the present invention. As shown FIG.

2, the bridge component 105 is a core logic chipset integrated circuit device that provides core logic functions for the computer system 100. The GPU 110 is coupled to the bridge component 105 via a graphics bus 220.

In the FIG. 2 embodiment, the bridge component 105 performs core logic chipset functions for the computer system 100. Such functions include, for example, implementing or supporting system memory addressing for data reads/writes, interfacing with input output devices (e.g., such as hard drives, network adapters, etc.), handling asynchronous DMA transfers, and the like. Accordingly, the bridge component 105 includes a plurality of functional modules 201-204 for handling core logic functions for the computer system. In the FIG. 2 embodiment, the bridge component 105 includes modules for the graphics bus management (e.g., module 201), system memory addressing (e.g., module 202), CPU interfacing (e.g., module 203), and expansion bus interfacing (e.g., module 204). It should be noted that the term "core logic chipset" does not necessarily require two or more chips. Embodiments of the present invention can be implemented within a single chip that provides core logic functions for the computer system (e.g., a Northbridge chip).

In the present embodiment, the bridge component 105 also includes hardware support for implementing cooperative graphics processing functions with the GPU 110. This hardware support is implemented through the cooperative graphics functionality module 210. The cooperative graphics functionality implemented in the bridge component 105 functions in conjunction with the cooperative graphics processing functionality 211 within the GPU 110. The hardware (e.g., 210-211) within the bridge component 105 and the GPU 110 operate with each other in order to perform cooperative data processing and data execution between core logic component (e.g., bridge component 105) and the GPU 110 of computer system 100.

The bridge component 105 and the GPU 110 implement a handshaking mechanism that enables a mutual identification and negotiation of mutually supported cooperative processing functions between them. The mutually supported cooperative processing functions can be used to execute specialized or customized functions that are above and beyond basic standardized functionality.

The specialized or customized functions can be selectively provided. This allows the bridge component 105 and the GPU 110 to remain compatible with the installed base of x86 architecture computer systems. For example, the GPU 110 and the bridge component 105 can be used in other x86 compatible computer systems which support "standard" or "conventional" capabilities. This ensures compatibility with the x86 architecture, whereby a given computer system can be assembled with components (e.g., core logic chipsets, CPUs, GPUs, input output devices, etc.) from a large number of different manufacturers. Similarly, the selective provision of cooperative processing functions enables the bridge component 105 or the GPU 110 to be incorporated into a number of different types of x86 computer systems assembled with different components from different generations from the same, or different, manufacturer (e.g., a late generation high-performance core logic chipset coupled with an earlier generation lower performance GPU, etc.).

Figure 3:
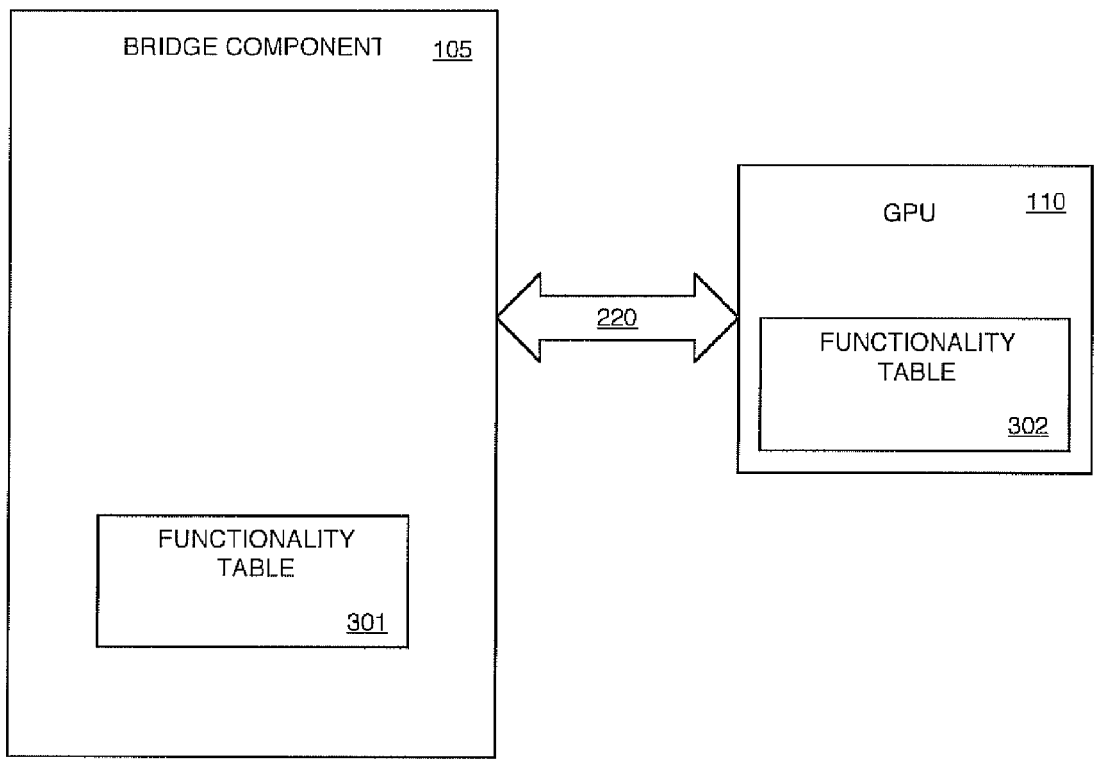
FIG. 3 shows a diagram depicting a functionality table within the bridge component and a functionality table within a GPU in accordance with one embodiment of the present invention.

FIG. 3 shows a diagram depicting a functionality table 301 within the bridge component 105 and a functionality table 302 within the GPU 110 in accordance with one embodiment of the present invention.

In the FIG. 3 embodiment, the functionality tables 301-302 are data structures that enumerate what cooperative processing functions are supported by their respective components. The functionality tables 301-302 also include information describing the manner in which the cooperative processing functions are interfaced with and the manner in which the cooperative processing functions are activated. The handshaking configuration communication accesses the functionality tables 301 and 302 and uses the information stored therein to identify what cooperative processing functions are mutually supported and what cooperative processing functions should be activated. The functionality tables thus allow devices from different generations and/or different performance levels to selectively enable mutually supported cooperative processing modes.

The mutually supported cooperative processing can be used implement specialized and/or customized functions. For example, the mutually supported cooperative processing can be used implement different types of bus transfer protocols across the graphics bus 220. These protocols can be non-standard protocols that increase performance above and beyond a basic conventional bus protocol such as, for example, the AGP protocol or PCI Express protocol. For example, the bridge component 105 and the GPU 110 can both include hardware for running the graphics bus 220 at a higher frequency than the standard specification frequency. When the bridge component 105 and the GPU 110 detect mutual support for such a mode, the graphics bus 220 can be shifted to the non-standard high-performance configuration. These types of nonstandard performance customizations can enable higher clock frequencies, lower data latencies, lower data transfer overhead, and other types of improvements for the graphics bus 220.

The mutually supported cooperative processing can also be used implement different types of access patterns to and from system memory. For example, nonstandard DMA transfers can be implemented that provide different capabilities above and beyond the basic x86 type DMA transfers. System memory can be accessed in nonstandard patterns (e.g., different cache line sizes, different tile sizes, different paging modes, etc.).

The mutually supported cooperative processing can also be used implement different types of data compression codecs. For example, hardware support for graphics data compression can enable customized compression modes between the GPU 110 and the bridge component 105. In such an embodiment, hardware support for the graphics data codec would reside within the bridge component 105 and the GPU 110.

The mutually supported cooperative processing can be used implement encryption algorithms that provide security between data transfers between the bridge component 105 and the GPU 110 and/or the system memory of the computer system (e.g., memory 115). In such an embodiment, an encryption engine would run within the bridge component 105 and a corresponding encryption engine would run within the GPU 110.

The mutually supported cooperative processing can also be cooperative graphics rendering, whereby the bridge component 105 includes hardware support for one or more graphics rendering operations. The hardware of bridge component 105 can operate in conjunction with, and in cooperation with, the much more powerful graphics rendering hardware of the GPU 110 to provide an improved overall rendering process. For example, the bridge component 105 can include raster operations hardware that functions by implementing certain types of raster computations on graphics primitives of the graphics data stream. These raster operations can be used by the GPU 110 to improve the overall graphics rendering process. Additionally, for example, these raster operations can reduce the amount of data that must be transferred across the graphics bus 220.

It should be noted that in each case, if there are no mutually supported cooperative processing functions (e.g., as in a case where the graphics processor and the core logic component are from different manufacturers that have built-in different capabilities), a basic functional level can be implemented (e.g., standard Northbridge functions, standard graphics processor functions, etc.). The basic function level will be in compliance with x86 architecture specifications and will be designed to ensure compatibility. In such a case, for example, the graphics bus 220 will be run at AGP or PCI express specified standards. In this manner, compatibility with the standard devices of the x86 architecture is ensured.

Figure 4:
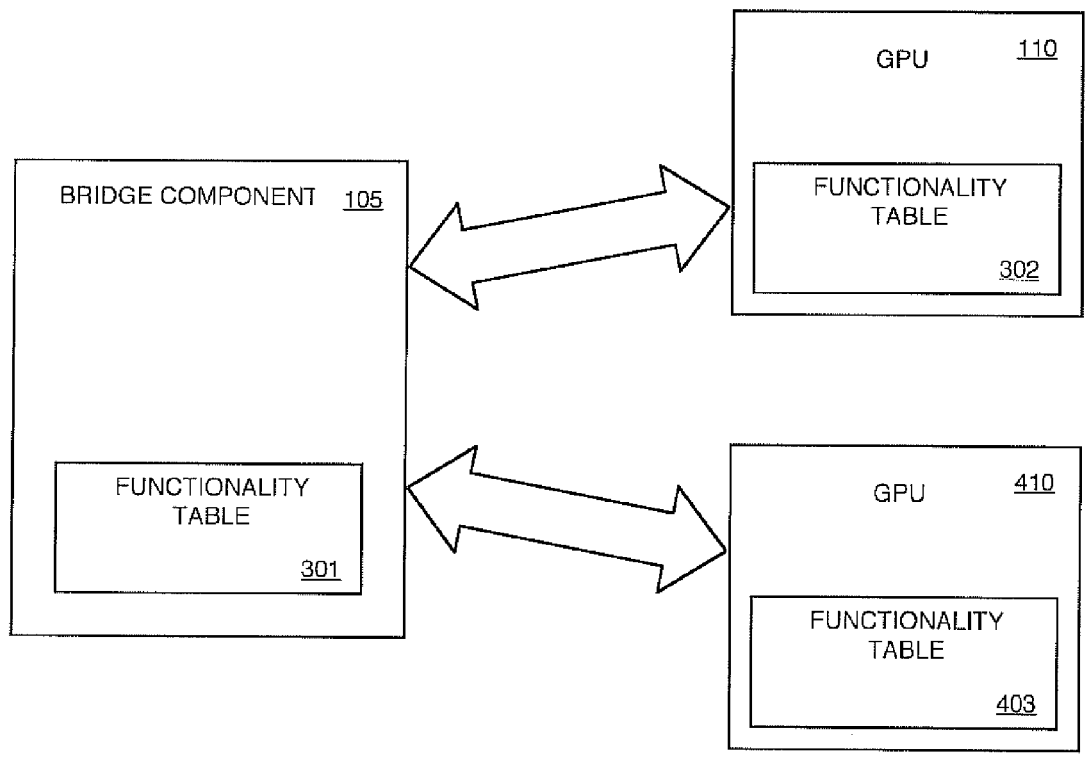
FIG. 4 shows a diagram depicting a functionality table within a second GPU in accordance with one embodiment of the present invention.

FIG. 4 shows a diagram depicting a functionality table 403 within a second GPU 410 in accordance with one embodiment of the present invention. In the FIG. 4 embodiment, the functionality tables 301-302 and 403 enable cooperative processing modes between dual GPUs (e.g., GPU 110 and GPU 410) and the bridge component 105. The functionality table 403 operates in conjunction with the functionality tables 301-302 to list what cooperative processing functions are supported by their respective components. The functionality tables 301-302 and 403 include information describing the manner in which the cooperative processing functions are interfaced with and activated. The handshaking configuration communication accesses the functionality tables 301, 302, and 403 and uses the information stored therein to identify what cooperative processing functions are mutually supported and what cooperative processing functions should be activated. As described above, the functionality tables thus allow multiple devices from different generations and/or different performance levels to selectively enable mutually supported cooperative processing modes.

Figure 5:
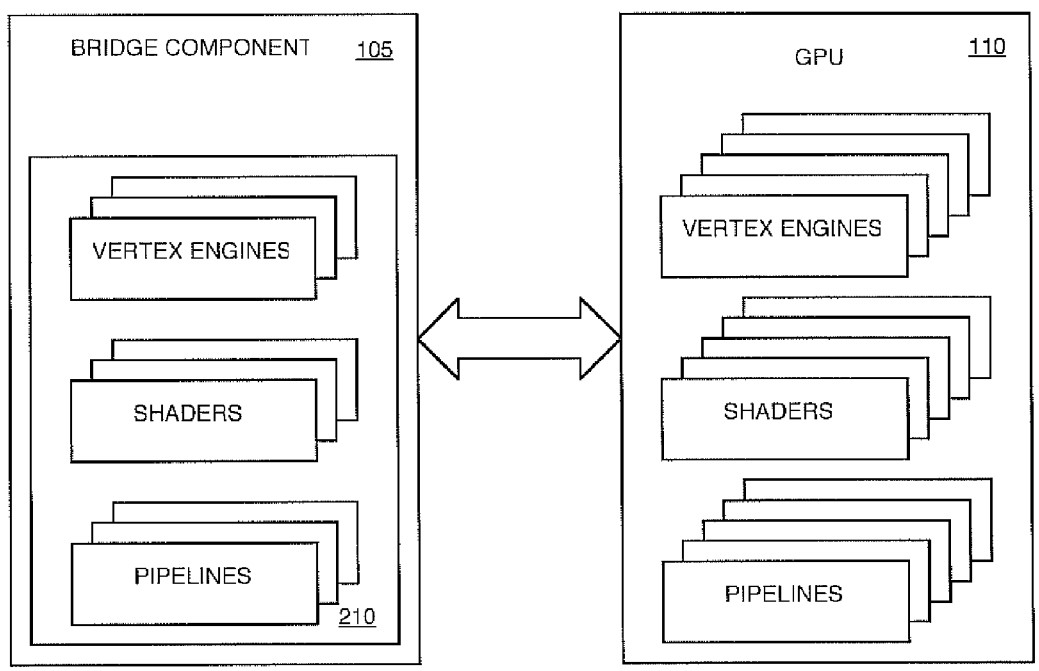
FIG. 5 shows a diagram depicting cooperative graphics processor between a bridge component and a GPU in accordance with one embodiment of the present invention.

FIG. 5 shows a diagram depicting cooperative graphics processing between the bridge component 105 and the GPU 110 in accordance with one embodiment of the present invention. As depicted in FIG. 5, in this embodiment, the cooperative processing hardware support 210 includes a number of vertex engines, shaders, and pipelines that can be operated in cooperation with the more powerful and more numerous vertex engines, shaders, and pipelines of the GPU 110. The cooperative graphics processing takes place using communication across the graphics bus 220. In one embodiment, the cooperative processing hardware support 210 comprises an embedded graphics processing module (e.g., integrated within the bridge component 105) configured to provide graphics processing functions in those situations where there is no discrete GPU coupled to the computer system.

Figure 6:
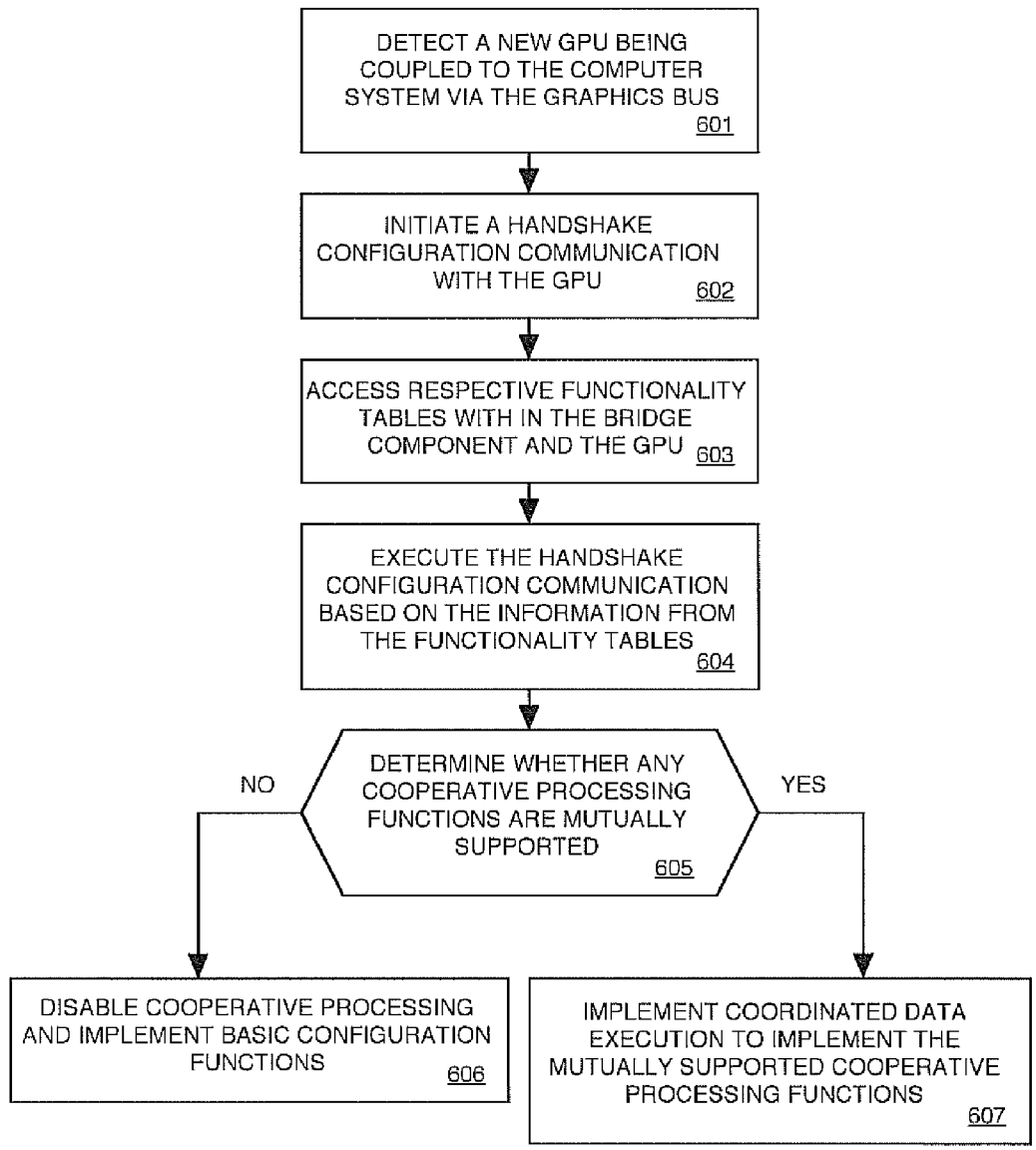
FIG. 6 shows a flowchart of the steps of a handshaking configuration process 600 in accordance with one embodiment of the present invention.

FIG. 6 shows a flowchart of the steps of a handshaking configuration process 600 in accordance with one embodiment of the present invention. As depicted in FIG. 6, process 600 depicts the operating steps of a handshaking configuration communication process as implemented between a core logic component (e.g., bridge component 105) and a graphics processor (e.g., GPU 110).

Process 600 begins in step 601, where the bridge component 105 detects a new GPU (e.g., GPU 110) being coupled to the computer system 100 via the graphics bus 220. In step 602, the bridge component 105 initiates a handshaking configuration communication with the GPU 110. As described above, this configuration dedication includes message exchanges for mutual identification. In step 603, the bridge component 105 and the GPU 110 access their respective functionality tables 301-302. In step 604, the configuration communication is executed between the bridge component 105 and the GPU 110 based on the information contained within the functionality tables 301-302. In step 605, the result of the configuration communication is a determination as to whether any cooperative processing functions are mutually supported.

In step 606, as described above, if there are no cooperative processing functions that are mutually supported by the bridge component 105 and the GPU 110, cooperative processing is disabled, and basic configuration functions are implemented by both the bridge component 105 and the GPU 110. In step 607, as described above, if there are one or more cooperative processing functions that are mutually supported, coordinated data execution is implemented between the bridge component 105 and GPU 110 in order to implement the one or more mutually supported cooperative processing functions.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for coordinated data execution in a computer system, comprising:
 a graphics processor including a first functionality table;
 a core logic component including a second functionality table coupled to a system memory; and
 a graphics bus coupling the graphics processor and the core logic component, wherein the graphics processor and the core logic component implement a configuration communication to determine a nonstandard mutually supported coordinated data execution mode by the graphics processor accessing the first functionality table and the core logic component accessing the second functionality table to identify a cooperative processing function supported by the graphics processor and the core logic component and to selectively configure the coordinated data execution mode between the graphics processor and the core logic component via communication across the graphics bus.

2. The system of claim 1, wherein the core logic component is a North bridge of the computer system.

3. The system of claim 1, wherein the graphics processor is detachably coupled to the graphics bus by a connector.

4. The system of claim 1, wherein the configuration communication is a message exchange communication for identifying at least one of a plurality of cooperative processing functions of the core logic component.

5. The system of claim 1, wherein the configuration communication is a message exchange communication for identifying at least one of a plurality of cooperative processing functions of the graphics processor.

6. The system of claim 1, wherein the configuration communication determines whether coordinated data execution is enabled or disabled, and wherein coordinated data execution is disabled when there is no cooperative processing function supported by the graphics processor and the core logic component.

7. The system of claim 1, further comprising:
a plurality of graphics processors coupled to the core logic component via the graphics bus, wherein the configuration communication selectively configures coordinated data execution between the core logic component and the graphics processors.

8. A method for handshaking configuration communication to enable coordinated data execution in a computer system, comprising:
accessing a first functionality table of a graphics processor;
accessing a second functionality table of a core logic component;
based on the first functionality table and the second functionality table, implementing a configuration communication between the core logic component and the graphics processor to determine whether at least one cooperative processing function is mutually supported by the graphics processor and the core logic component;
implementing nonstandard coordinated data execution between the graphics processor and the core logic component by using a plurality of shaders included in both the core logic component and the graphics processor, wherein the coordinated data execution is implemented via the graphics bus if at least one cooperative processing function supported; and
disabling coordinated data execution between the graphics processor and the core logic component if no cooperative processing function is supported.

9. The method of claim 8, wherein the core logic component is a North bridge of the computer system.

10. The method of claim 8, wherein the graphics processor is detachably coupled to the graphics bus by a connector.

11. The method of claim 8, wherein the configuration communication is a message exchange communication for identifying the at least one cooperative processing function supported by the graphics processor and the core logic component.

12. The method of claim 8, further comprising:
implementing coordinated data execution between the core logic component and a plurality of graphics processors coupled to the core logic component via the graphics bus, wherein the configuration communication selectively configures the graphics processors and the core logic component for coordinated data execution based on at least one cooperative processing function supported by the graphics processors and the core logic component.

13. The method of claim 8, wherein the coordinated data execution is a raster operation executed by the core logic component, a graphics data codec executed by the core logic component, a system memory frame buffer managed via the core logic component, or an encryption engine executed by the core logic component.

14. The method of claim 8, wherein the configuration communication includes a mutual identification of the graphics processor and the core logic component.

15. A computer readable media for implementing handshaking configuration communication to enable coordinated data execution in a computer system, the media storing computer readable code which when executed by a computer system cause the computer system to implement a method comprising:
accessing a first functionality table of a graphics processor;
accessing a second functionality table of a core logic component;
implementing a configuration communication between the core logic component and the graphics processor to determine whether a nonstandard at least one cooperative processing function is supported by the graphics processor and the core logic component in accordance with the first functionality table and the second functionality table;
implementing coordinated data execution between the graphics processor and the core logic component via the graphics bus if at least one cooperative processing function supported; and
disabling coordinated data execution between the graphics processor and the core logic component if no cooperative processing function supported.

16. The computer readable media of claim 15, wherein the core logic component is a North bridge of the computer system.

17. The computer readable media of claim 15, wherein the graphics processor is detachably coupled to the graphics bus by a connector.

18. The computer readable media of claim 15, wherein the configuration communication is a message exchange communication for identifying the at least one cooperative processing function supported by the graphics processor and the core logic component.

19. The computer readable media of claim 15, wherein the coordinated data execution is a raster operation executed by the core logic component, a graphics data codec executed by the core logic component, a system memory frame buffer managed via the core logic component, or an encryption engine executed by the core logic component.

20. The computer readable media of claim 15, wherein the configuration communication includes a mutual identification of the graphics processor and the core logic component.

21. The computer readable media of claim 15, wherein the method further comprises:
implementing coordinated data execution between a plurality of shaders included in both the core logic component and a plurality of graphics processors coupled to the core logic component via the graphics bus, wherein the configuration communication selectively configures the graphics processors and the core logic component for coordinated data execution based on at least one cooperative processing function supported by the graphics processors and the core logic component.

* * * * *